Dec. 25, 1962  M. J. PURETIC  3,069,799
NET HANDLING APPARATUS
Original Filed March 9, 1957  3 Sheets-Sheet 1
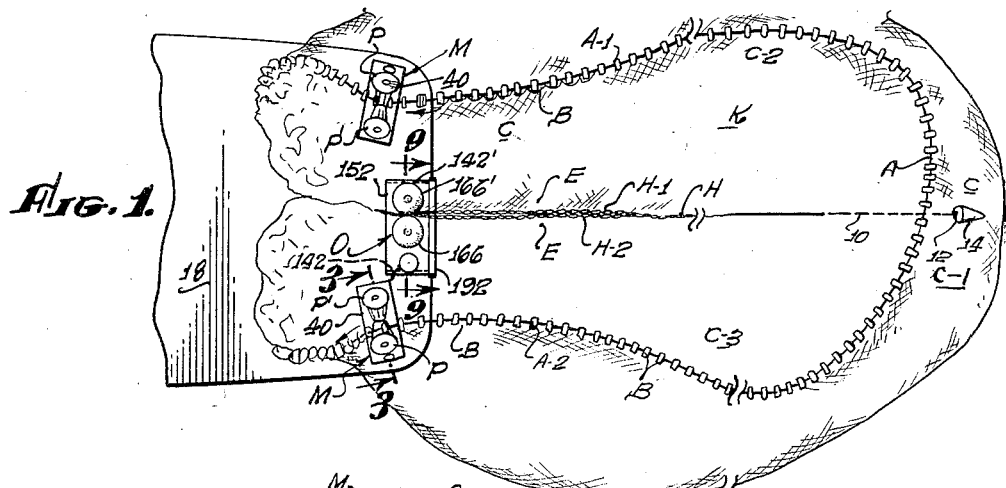
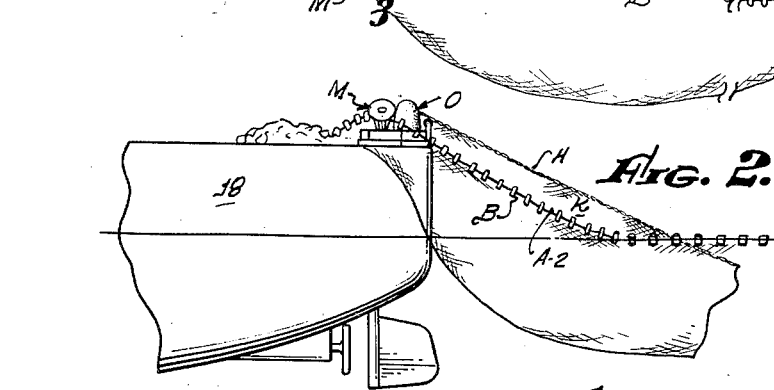
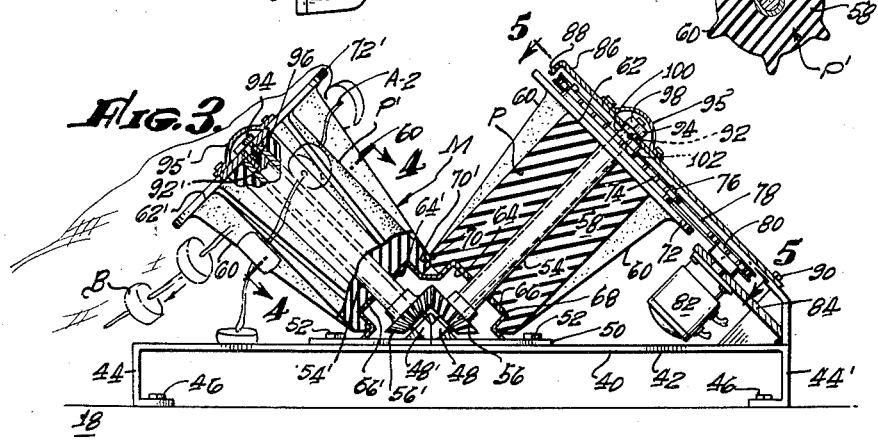
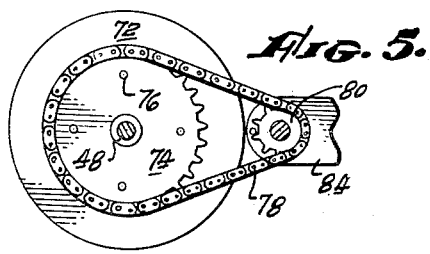
MARIO J. PURETIC,
INVENTOR.
BY
William C. Babcock
ATTORNEY.

Dec. 25, 1962        M. J. PURETIC        3,069,799
NET HANDLING APPARATUS
Original Filed March 9, 1957        3 Sheets-Sheet 2
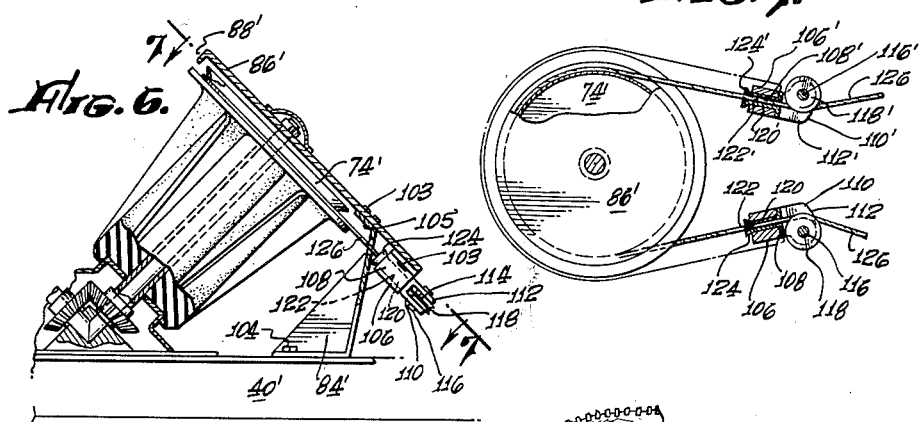
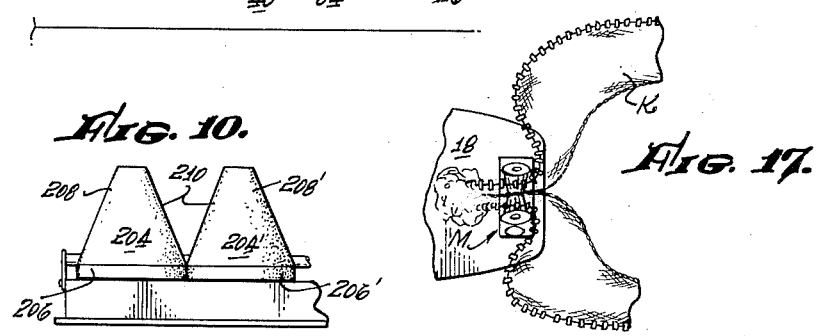
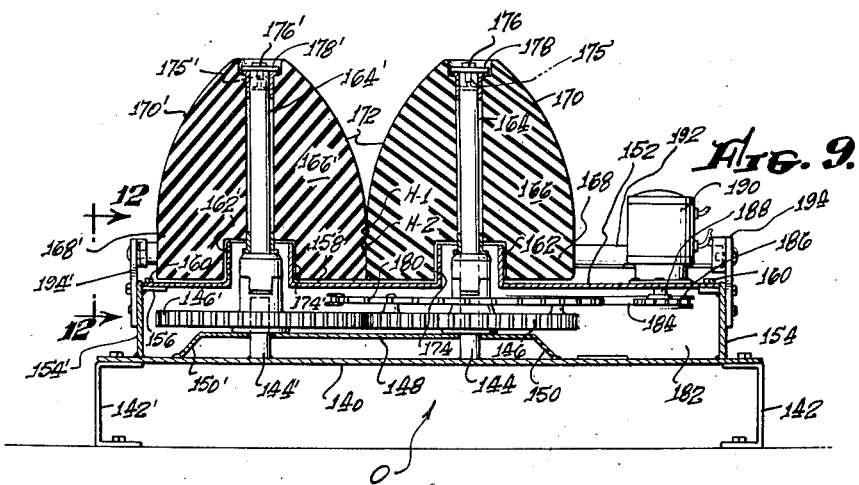
MARIO J. PURETIC,
INVENTOR.
BY William C. Babcock
ATTORNEY.

Dec. 25, 1962     M. J. PURETIC     3,069,799
NET HANDLING APPARATUS
Original Filed March 9, 1957     3 Sheets-Sheet 3
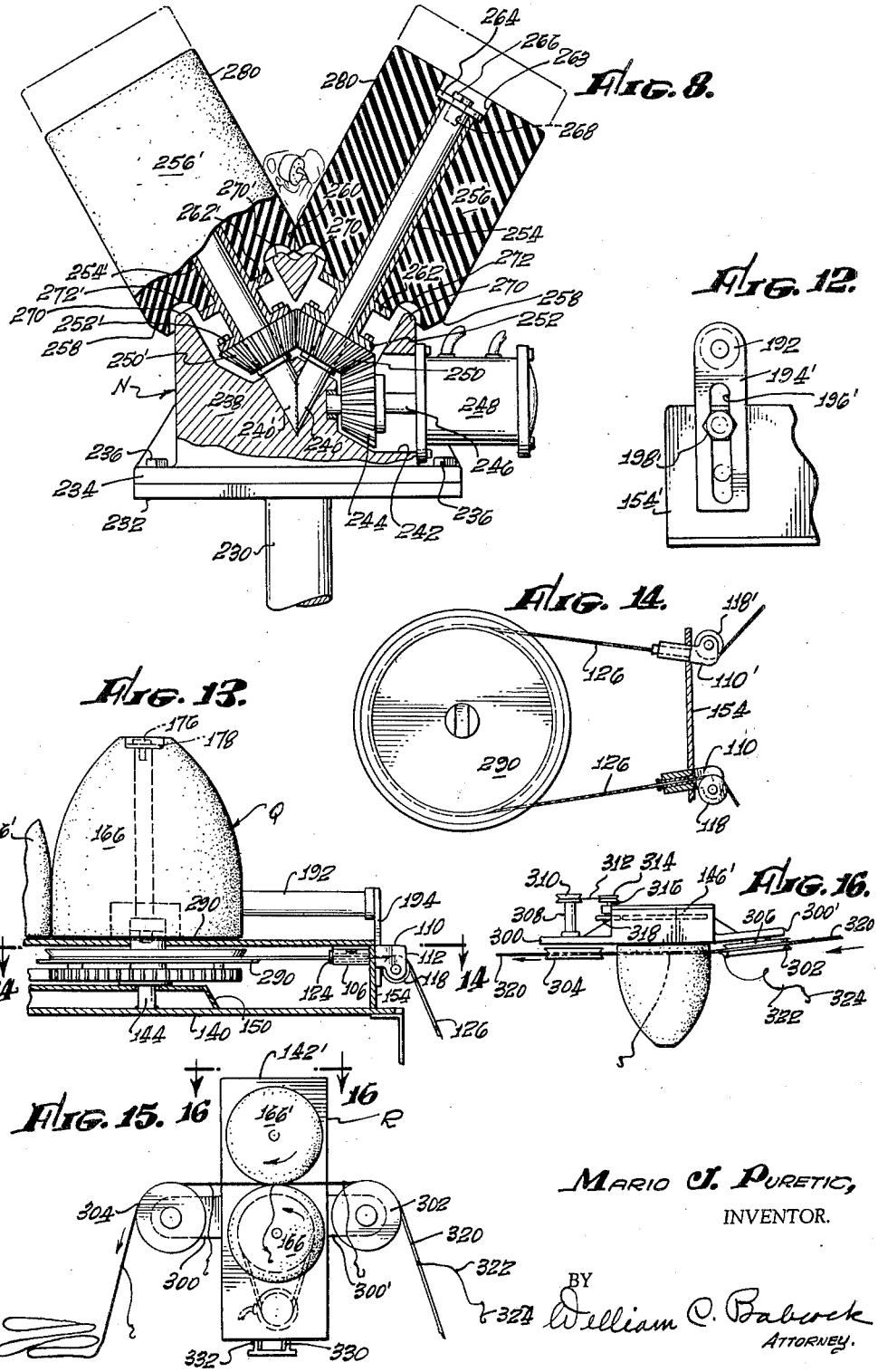
Mario J. Puretic,
INVENTOR.
BY William C. Babcock
ATTORNEY.

United States Patent Office 3,069,799
Patented Dec. 25, 1962

3,069,799
NET HANDLING APPARATUS
Mario J. Puretic, San Pedro, Calif. (% Malcolm Lucas, 100 Long Beach Blvd., Long Beach 2, Calif.)
Continuation of application Ser. No. 651,664, Apr. 9, 1957. This application Oct. 10, 1961, Ser. No. 145,014
14 Claims. (Cl. 43—8)

This is a continuation of my co-pending patent application, Serial No. 651,664 filed April 9, 1957 and now abandoned.

The present invention relates generally to the field of commercial fishing equipment, and more particularly to a power operated fairlead device for use in retrieving nets from the sea.

A major object of the present invention is to provide a universal power operated device for use in retrieving nets and long lines from the sea which is equally well adapted for installation on open boats as well as those vessels having a superstructure and/or a boom forming a part thereof.

Another object of the invention is to supply a power operated device that may be easily mounted in or removed from an operating position on a boat, requires no special equipment such as a boom or derrick for support thereof, is of an extremely simple mechanical structure, requires a minimum of maintenance attention, and can be merchandised at a sufficiently low price as to encourage widespread use thereof in all phases of commercial fishing.

A further object of the invention is to provide a power operated device in which a plurality of rotating surfaces not only engage, but guide the net being drawn thereby, thus eliminating the necessary heavy frame and stationary net guides forming a part of the net retrieving device disclosed in my Patent No. 2,733,531 which issued February 7, 1956.

Still another object of the invention is to provide a power operated device that need not be oriented relative to the direction in which the net or long line is being drawn.

Yet another object of the invention is to supply a power operated device that automatically centers the portion of a net engaged thereby and exerts an even pull on all sections thereof.

A still further object of the invention is to furnish a power operated net retrieving device that is compact, light in weight, and may be driven by either an electric motor, hydraulic motor, air motor, gasoline auxiliary engine, V-belt, wedge-and-friction rope drive, or sprocket chain drive.

An additional object of the invention is to provide a net retrieving apparatus that is adapted to haul in a net having a cork line forming a part thereof that may be disposed forwardly, sidewardly and rearwardly of the device, with at least one of the rotatable members thereof serving the dual function of frictionally engaging the net and guiding the net into said engagement.

These and other objects and advantages of the invention will become apparent from the following description of a preferred form and certain alternate forms thereof, and from the accompanying drawings illustrating same in which:

FIGURE 1 is a fragmentary plan view of the stern portion of a boat showing three devices embodying the teaching of the present invention installed thereon which are so arranged as to permit engagement thereby of the bottom lines and cork lines of a net;

FIGURE 2 is a side elevational view of the boat and devices shown in FIGURE 1;

FIGURE 3 is an enlarged combined side elevational and vertical cross-sectional view of a preferred form of net-engaging device embodying the invention taken on line 3—3 of FIGURE 1;

FIGURE 4 is a transverse cross-sectional view of one of the rotatable net engaging members taken on line 4—4 of FIGURE 3;

FIGURE 5 is a top plan view of one of the rotatable net engaging members taken on line 5—5 of FIGURE 3;

FIGURE 6 is a combined side elevation and vertical cross-sectional view of a modification of the preferred form of the invention;

FIGURE 7 is a transverse cross-sectional view of the device shown in FIGURE 6 taken on line 7—7 thereof;

FIGURE 8 is a combined side elevational and vertical cross-sectional view of a first alternate form of the device embodying the invention that is gear driven, mounted on the upper end portion of a supporting pedestal, on which device net engaging members of various lengths may be interchangeably mounted;

FIGURE 9 is a side elevational view of a second device that incorporates the teachings of the invention;

FIGURE 10 is a side elevational view of the device shown in FIGURE 9 on which interchangeable net engaging members of a different shape are mounted;

FIGURE 11 is a side elevational view of the device shown in FIGURE 9 on which interchangeable net engaging members of another shape are mounted;

FIGURE 12 is a fragmentary end elevational view of the device shown in FIGURE 9 taken on line 12—12 thereof;

FIGURE 13 is a fragmentary side elevational view of a third alternate form of the device that incorporates the teachings of the invention;

FIGURE 14 is a horizontal cross-sectional view of the device shown in FIGURE 13 taken on line 14—14 thereof;

FIGURE 15 is a side elevational view of a fourth device constructed in accordance with the teachings of the invention;

FIGURE 16 is a top plan view of the device shown in FIGURE 15 taken on line 16—16 thereof; and FIGURE 17 is a plan view of one of the devices of the invention shown retrieving a net that extends rearwardly and sidewardly therefrom.

Referring to the drawings, it will be seen that devices constructed in accordance with the teachings of the invention are adapted for use in retrieving nets and long lines from the sea, with sections of said nets and lines being thereafter sequentially disposed aboard a vessel and placed in stacked arrangement.

FIGURES 1 and 2 illustrate one use of the preferred form M of the invention shown in FIGURE 3 in conjunction with two laterally separated second alternate forms O of the device seen in FIGURE 9 when withdrawing a net from the sea of the type disclosed and claimed in my Patent No. 2,925,680 issued February 23, 1960, entitled Net and Method of Using Same. A draw net K of this type includes a cork line A, which as its name implies, has a number of corks, floats or other buoyant bodies B attached thereto at spaced intervals. An elongate wall or panel of webbing, referred to generally by the letter C, is supported from cork line A. From experience it has been found desirable to form a rearwardly disposed portion known as the bunt C–1 that is relatively wide in webbing C, from which bunt narrower wings C–2 and C–3 extend on each side thereof. The lower edge portions E of net K support a longitudinally extending line H, which is hereinafter referred to as the bottom line. It is to be understood, however, that the term "bottom line" is synonymous with the terms "lead line," "ground line," "ring line," and other terms used in commercial fishing to denote a line which extends around the bottom edge of the net.

Line H may take a number of forms, and it has been found possible to employ either steel cable, manilla rope, or link chain for this purpose. A cable 10 is provided that is affixed to substantially the center of the bottom line H, and when the net K is set the cable extends rearwardly and downwardly therefrom as shown in FIGURES 1 and 2. The outer extremity of cable 10 is looped or otherwise attached to an eye 12 that is rigidly secured to a mushroom-shaped weight 14. The manner in which the above described net is transported to the fishing grounds and set is described in detail in my aforementioned Patent No. 2,925,680 and need not be repeated herein.

When net K is so set, it will be apparent that the weight 14 will rest on the floor of the sea or sink the length of cable 10, drawing it downwardly from bottom line H. Thereafter the vessel 18 is so moved relative to the weight 14 (FIGURE 1) that the two portions of the bottom line generally designated H–1 and H–2 are placed under tension and caused to move rapidly inwardly and snap together in substantially parallel relationship to close the bottom of the net whereby the catch is impounded within the net. Bottom line portions H–1 and H–2 tend to remain in the closed position as shown due to the drag imposed by the weight 14 as the bottom line H is drawn in a direction away from the weight, as will be explained hereinafter. For clarity of description herein, the free end portions of cork line A are further identified as portions A–1 and A–2.

A second device O of the invention is mounted at an elevated position above the central stern portion of vessel 18 and one preferred device M of the invention is disposed in raised position on each side of the device O. The free end portions A–1 and A–2 of the cork line A are manually placed in frictional contact with each of the preferred forms M of the invention whereby the webbing C–1 and C–2 associated therewith will billow out in the water over the stern side portions of vessel 18, as shown in FIGURES 1 and 2. When the two devices M are actuated in a manner to be later explained, the cork line portions A–1 and A–2, together with the webbing wings C–1 and C–2 are drawn aboardship. Inasmuch as the two preferred forms of the invention are independently power units, the cork line portions A–1 and A–2 may be drawn aboard at the same or at different rates. After the bottom lines H–1 and H–2 have been snapped together and the bottom of the net K is closed, these bottom lines are manually placed in frictional contact with the device O, which when actuated draws the lines and the associated webbing toward the vessel and at the same time maintains the lines in a taut net closing position. It will be obvious that due to the fact that the three units are independently actuated, it is possible to adjust the speed of each unit in order to control the net and catch contained therein as it is being drawn toward the vessel. By means of the power operated devices M and device O, net K is drawn aboardship until a relatively small portion thereof remains in the water and the fish impounded therein may then be either bailed or pumped into the vessel 18 in a conventional manner.

Referring now to FIGURES 3, 4 and 5 for a detailed description of the preferred form of the invention M, it will be seen to include a base 40 that is defined by an elongate rigid member 42, from the ends of which two L-shaped legs 44 and 44' depend downwardly that are adapted to be secured to a suitable portion of vessel 18 (not shown) by bolts 46 or the like. Two shafts 48 and 48' are provided that are welded or otherwise secured to one another at their lower ends, with the shafts extending upwardly and away from one another to define a V-shaped space therebetween. The lower end portions of shafts 48 and 48' are rigidly attached to a plate 50, which by means of bolts or other securing means 52, is rigidly affixed to the upper surface of member 42. Two elongate tubular sleeves 54 and 54' are rotatably supported on shafts 48 and 48', and the lower end portions of these sleeves are removably affixed by conventional means to two meshed beveled gears 56 and 56' respectively, as shown in FIGURE 3.

Sleeves 54 and 54' support two rotatable net engaging fairlead members referred to generally by the letters P and P' respectively, and as they are identical in construction, but one member will be described in detail herein. Fairlead member P includes a solid cylindrical body 58 preferably formed of a resilient material such as rubber or the like, on the exterior surface of which a number of circumferentially spaced longitudinally extending ribs 60 are formed (FIGURES 3 and 4). Ribs 60 which are uniform in transverse cross section originate at the lower portion of body 58 and are so shaped that the upper end portions thereof project or jut farther away from the body than the lower ends thereof. The upper ends of ribs 60 terminate flush with the upper surface 62 of body 58.

Circular recesses 64 and 64' are formed in the lower portions of bodies 58 and 58', which recesses rotatably engage upwardly extending portions 66 and 66' of a frame 68 that is affixed to plate 50. The lower surfaces of bodies 58 and 58' are provided with beveled edges 70 and 70' that are in rotatable abutting contact (FIGURE 3), and these contacting edges together with the opposing sides of fairlead members P and P' cooperatively define a V-shaped space through which successive sections of the net K can be frictionally drawn.

Two circular plates 72 and 72' are welded or otherwise secured to the outer extremities of sleeves 54 and 54' and in abutment with faces 62 and 62' of members P and P'. A sprocket 74 is rigidly affixed in parallel spaced relationship to the exterior face of plate 72 by bolts 76 or other fastening means. An endless link belt 78 extends from sprocket 74 to a driving sprocket 80 which is actuated by a prime mover 82 that may be a hydraulic motor or the like, and is supported by conventional means on a bracket 84 projecting upwardly from base 40. Bracket 84 also serves to removably support an elongate shield 86 having a downwardly extending rim 88 sufficiently wide to prevent inadvertent personal contact with the chain or belt 78 while it is in motion. Shield 86 is preferably supported from bracket 84 by a bolt 90 or the like (FIGURE 3).

Tapped bores 92 and 92' are formed in the outer end portions of shafts 48 and 48'. Bore 92' is engaged by a bolt 94 which extends through an opening 96 in plate 72' to prevent displacement of the net-engaging member P' from shaft 48'. A bolt 98 or other suitable threaded member is provided that extends inwardly through an opening 100 in shield 86 and an opening 102 in sprocket 74 to engage opening 92 to prevent displacement of member P from shaft 48. If desired, the exposed portions of bolts 94 and 98 may be concealed by covers 95' and 95 respectively, that are removably affixed to the central exterior surfaces of plates 72' and 72 by conventional fastening means.

Upon actuation of prime mover 82 the driving sprocket 80 is rotated to drive belt 78 and impart rotary motion to sprocket 74 and the net-engaging fairlead member P affixed thereto. Sleeve 54, of course, rotates concurrently with fairlead member P, as does the beveled gear 56. Clockwise rotation of fairlead member P causes counter-clockwise rotation of fairlead member P' due to the meshed gears 56 and 56', and as a result portions of a net contacting either or both of the fairlead members P and P' are moved through the space defined therebetween (FIGURE 3). A portion A–2 of cork line A is shown in engagement with fairlead member P' in FIGURES 1 and 3.

It will be particularly noted in FIGURES 1, 3 and 17 that either of the fairlead members P or P', or both, can serve the dual function of frictionally engaging the net as well as guiding it into frictional engagement with one or both of these members, even when the outer portion of the net is sidewardly and rearwardly positioned relative to the members. A modification of the preferred form M of the invention is shown in FIGURES 6 and 7 with which a rope or cable drive is provided. This device includes a base 40' having an upwardly projecting bracket 84' mounted thereon by bolts or other conventional means 104. In this modified form a sheave 74' replaces sprocket 74. A shield 86' that is substantially identical in structure to shield 86 is removably mounted on an upwardly and angularly disposed leg portion 105 of bracket 84' by bolts or screws 103. Two laterally spaced tubular members 106 and 106' are mounted on the lowermost end portion of shield 86' and have bores 108 and 108' formed therein that are in the same plane.

Two lizard pulley assemblies 110 and 110' are provided that are identical in construction, and accordingly but one assembly will be described in detail herein. Pulley assembly 110, as can best be seen in FIGURES 6 and 7, includes a block 112 in which a slot 114 is formed and across which a shaft 116 transversely extends. A pulley 118 is rotatably mounted in slot 114 on shaft 116. A shank 120 extends outwardly from block 12 and a longitudinally extending bore 122 is formed in this shank that is in alignment with the circumferentially extending groove formed on pulley 118 and the circumferentially extending groove defined in sheave 74'. Shank 120 must be sufficiently long to permit formation of a flare 124 on the outwardly projecting end thereof after the shank is slidably and rotatably positioned in member 106. As will be obvious, this flare serves to prevent displacement of shank 120 from member 106. When pulley assembly 110 is positioned as above described, and a driving cable or rope 126 is caused to engage pulley 118 and pass through bore 122 to sheave 74', the portion of a cable 126 in contact with sheave 74' is at all times held in alignment therewith, irrespective of the position that portion of cable 126 may assume which is extending from assembly 110 unless it is in binding frictional contact therewith. What has been said of pulley assembly 110 is equally descriptive of assembly 110'.

The power means employed in moving cable 126 are not shown, as they may be any one of a variety of conventional devices normally provided on a commercial fishing boat such as a winch head, bell pulley, or the like. Some of the advantages provided by the cable or rope drive device above described are that it is economical in operation, very readily installed, and in most instances permits the use of power equipment already existing on a boat as the prime mover for the invention.

The device O (FIGURE 9) includes an elongate, rigid base plate 140 that has two identical, transversely disposed end supports 142 and 142' of channel-shaped cross section bolted or otherwise secured to the under surface thereof. Two longitudinally separated, vertical shafts 144 and 144' are welded or otherwise affixed to the upper surface of plate 140 and rotatably support two meshing gears 146 and 146' respectively. These gears are rotatably supported in raised position by a rigid pair of laterally separated parallel strips 148 between which shafts 144 and 144' project upwardly. Downwardly depending end pieces 150 and 150' hold strips 148 in a fixed elevation above plate 140. A housing 152 is provided above base plate 140 that is defined by two vertical end pieces 154 and 154', the bottom edges of which are welded to the upper surface of the base plate. The inner upper portions of end pieces 154 and 154' support two lugs 156 and 156' respectively, to which an elongate horizontal cover plate 158 is affixed by bolts 160. Two tubular bosses 162 and 162' project upwardly from plate 158, and shafts 144 and 144' respectively are centrally disposed therein.

A pair of sleeves 164 and 164' are rotatably mounted on shafts 144 and 144' respectively and threaded or otherwise removably secured to upwardly projecting hub portions of gears 146 and 146'. Sleeves 164 and 164' are rigidly affixed to two rotatable net engaging fairlead members 166 and 166' respectively, which are preferably formed of a resilient material such as rubber, or the like. Fairlead members 166 and 166' comprise straight-walled cylindrical lower portions 168 and 168' that are in rotary abutting contact, as well as upper portions 170 and 170' which taper upwardly and radially inwardly in convex curves to define a generally V-shaped space 172 therebetween. Preferably, the diameter of each fairlead member at its upper end is about one-fourth the diameter of its lower portion. Recesses 174 and 174' are formed in the exterior faces of portions 168 and 168' extending upwardly from the bottom thereof.

Tapped bores 175 and 175' respectively are formed in the upper end portions of shafts 144 and 144' and are threadedly engaged by bolts 176 and 176' on which washers 178 and 178' are mounted whereby inadvertent displacement of members 166 and 166' from the shafts is prevented, yet permits easy removal of the members therefrom when necessary. A sprocket 180 is rigidly connected to sprocket 146 located within the confines of housing 152. Two identical side pieces 182 that extend between end pieces 154 and 154' serve to complete the housing 152. An endless link belt 184 connects sprocket 180 to a driving sprocket 186 mounted on the lower end of a vertical drive shaft 188 projecting upwardly through an opening formed in cover plate 158 to a prime mover 190, such as a hydraulic motor or the like.

The device O is preferably provided with a horizontal roller 192 that is rotatably supported between a pair of vertical journal plates 194 and 194' as can best be seen in FIGURE 12, in which elongate slots 196 and 196' respectively are formed. Bolts 198 and 198' project through slots 196 and 196' respectively to engage tapped bores formed in end pieces 154 and 154'. When bolts 198 and 198' are tightened after plates 194 and 194' are placed at the desired height relative to members 170 and 170', the roller 192 may be positioned to regulate the depth at which a line or net will travel when frictionally engaged by fairlead members 166 and 166'. The position of the bottom lines H–1 and H–2 of net K when engaged by members 170 and 170' is shown in FIGURES 1, 2 and 9. It will be noted that these bottom lines are frictionally disposed between the abutting lower portions of the fairlead members while the net K and the float line A are frictionally disposed in the open space defined between said fairlead members thereabove..

The housing 152 not only provides a convenient support for prime mover 190, but of more importance, serves as a shield to protect gears 146, 146', sprockets 180, 186 and belt 184 from water that drips down from rotatable members 166, 166' as a wet net is being retrieved and travels therebetween.

Although from experience the rotatable net engaging fairlead members 170 and 170' have been found to be quite satisfactory in actual use, it has been determined that a modification thereof as illustrated in FIGURE 10 and identified as fairlead members 204 and 204' are particularly well adapted for certain uses. Fairlead members 204 and 204' are identical in shape and the diameter of the lower cylindrical portions 206 and 206' thereof place them in abutting rotary contact in the same manner as the forms described hereinabove. The upper portions 208 and 208' of resilient fairlead members 204 and 204' are of frusto-conical configuration and define a V-shaped space 210 therebetween wherein a portion of net can be sectionally and frictionally gripped.

FIGURE 11 illustrates still another modification of net engaging fairlead members adapted for use with the form of the invention shown in FIGURE 9 and identified by the numerals 212 and 212', which include two lower cylindrical portions 214 and 214' sufficiently broad in diameter to be in rotary abutting relationship. Members 212 and 212' develop into upwardly and inwardly tapering concave portions 216 and 216'. For greater frictional engagement of the net as it passes through the generally V-shaped space 218 defined between portions 216 and 216', the upper portions are provided with circumferentially spaced, longitudinally extending ribs 220 that are preferably out of phase relative to one another as fairlead members 216 and 216' rotate.

The first alternate form of device N embodying the invention is shown in FIGURE 8 and preferably includes a pedestal 230 or other upright support that is secured to the boat deck (not shown), the upper end of which terminates in a horizontal plate 232 to which a base plate 234 is affixed by bolts 236 or other conventional means. Plate 234 supports an upwardly extending body 238 of generally circular horizontal cross section that has a central depressed portion formed therein from which two rigid shafts 240 and 240' project upwardly and outwardly in angular relationship. An inwardly extending horizontal recess 242 is formed in body 236 that serves to house a beveled gear 244 rigidly mounted on the end of a horizontal shaft 246 which is rotated by a prime mover 248 such as a hydraulic motor or the like. Two meshing level gears 250 and 250' are rotatably supported on shafts 240 and 240' respectively, and gear 250 engages a driving gear 244. The upper faces of gears 250 and 250' are in abutting contact with flanges 252 and 252' that are formed on the lower ends of tubular sleeves 254 and 254', which in turn are rotatably mounted on shafts 240 and 240' respectively. Two cylindrical net engaging fairlead members 256 and 256' are provided that are rigidly affixed to sleeves 254 and 254' as can best be seen in FIGURE 8. The fairlead members 256 and 256' have lower tapered end portions 258 and 258' that are in rotary abutting contact, as indicated by the numeral 260 in FIGURE 8.

Second flanges 262 and 262' are formed on sleeves 254 and 254', positioned above flanges 252 and 252', with flanges 262 and 262' being in abutment with the lower faces of net engaging fairlead members 256 and 256'. Identical recesses 263 and 263' are formed in the outer end portions of fairlead members 256 and 256', in which recesses washers 264 and 264' are disposed which serve to prevent inadvertent displacement of fairlead members 256 and 256' from shafts 240 and 240'. Washers 264 and 264' engage surface portions of fairlead members 256 and 256' and are held in position on the shafts by bolts 266 and 266' in engagement with tapped bores 268 and 268' formed in the upper portion of the shafts.

The body 238 defines two upwardly projecting, opposing circular portions 270 and 270' that project into circular grooves 272 and 272' formed in the lower surface portions of fairlead members 256 and 256'. When the prime mover 248 is energized the beveled driving gear 244 is rotated and due to meshing with gear 250, this latter gear as well as gear 250' are rotated to cause the fairlead members 256 and 256' to rotate in opposite directions. It is to be understood that fairlead members 256 and 256' are not limited as to the length shown in FIGURE 8, but may be of any desired length required to establish a V-shaped space 280 therebetween sufficient to permit efficient handling of a particular cross section of net to be engaged thereby. To permit handling of nets of a variety of size, fairlead members 256 and 256' shown in solid line in FIGURE 8 may be replaced by similar net engaging members which are longer and extend to positions shown in phantom line in the same figure. Due to the structure thereof, fairlead members 256 and 256' are interchangeable and easily mounted on and removed from the shafts of the first form of the invention, whereby fairlead members 256 and 256' of increased or decreased lengths may be mounted on the first alternate form of the invention to handle nets K of various transverse cross section disposed in space 280.

Yet another device Q incorporating the teachings of the invention is shown in FIGURES 13 and 14, which is similar to the device O except that a cable drive is employed therewith. In this form of the device a sheave 290 and the lizard pulley assemblies 110 and 110' previously are mounted on end plate 154 (FIGURE 13) to replace sprocket 180. Sheave 290 and pulley assemblies 110 and 110' are engaged by a cable 126 in the same manner as shown in figure, and by movement of the cable the net engaging members 166 and 166' can be rotated in precisely the same manner as similarly identified members in the second alternate form of the invention (FIGURE 9).

Another device R constructed in accordance with the invention is shown in FIGURES 15 and 16 and is substantially the same as the device O when it is stood on end with the end piece 142' occupying the uppermost position. Two horizontal arms 300 and 330' project outwardly from opposite sides of the vertical plate 140 and rotatably supported on a shaft 306 affixed to arm 300'. Pulley 304 is rigidly affixed to a horizontal shaft 308 that is rotatably mounted on arm 300. A driven pulley 310 is rigidly affixed to shaft 308 from which a belt 312 extends to a driving pulley 314 that is mounted on a horizontal shaft 316 to which a gear 318 is secured that meshes with gear 146'.

When it is desired to use the device R to retrieve a long line 320 to which a number of spaced leaders 322 are attached that bear hooks 324, the lines is threaded over the idling pulley 302 and between fairlead members 166 and 166' which frictionally engage same and then passes over the driven pulley 304. The driving of pulley 304 is such that it rotates at a faster rate than fairlead members 166 and 166', and as a result at all times tends to maintain the action of the line 320 taut and take up the slack between the driving pulley 304 and members 166 and 166'. Leaders 322 (FIGURES 15 and 16) pass over members 166 in a downwardly depending position as the line is drawn aboardship. This also occurs in the event a fish should remain affixed to a leader as the line is drawn aboard.

A tubular member 330 extends downwardly from end piece 141' and slidably and rotatably fits within a tubular socket 332 that is rigidly attached by conventional means to the deck or supporting portion of the boat. In this manner the fourth alternate form of the invention can be rotated to place the pulleys 302 and 304 in alignment with the direction in which the long line 320 is drawn. The arm 300' and pulley 302 are slightly angularly disposed relative to arm 300, and as a result cause the incoming line 320 to be engaged by the contacting portions 168 and 168' of fairlead members 166 and 166'. Pulley 302 is formed with an abnormally deep tapered groove to prevent inadvertent displacement of line 320 therefrom.

Although my invention is fully capable of achieving the results and providing the advantages hereinbefore mentioned, it is to be understood that I do not mean to be limited to the details of construction above described other than as defined in the appended claims.

I claim:

1. An apparatus for use in sequentially raising consecutive sections of a fish net to an elevated position above a horizontal surface from which said sections are sequentially lowered as a moving column and guided into a desired configuration on said surface, comprising: two shafts that extend upwardly and outwardly away from one another; two adjacent rotatable members supported by said shafts which define a space therebetween in which said sections of net are frictionally engaged by said members to the extent that the balance of said net is moved when said members are rotated; means supporting said shafts above said surfaces; and driving means to concurrently rotate one of said members in a clockwise direction and the other of said members in a counter-clockwise direction, with at least one of said members when so rotating guiding successive sections of said net into said space to be frictionally engaged by said members.

2. An apparatus as defined in claim 1 wherein the upper end of each of said members develop into an outwardly projecting circular flange to prevent inadvertent displacement of said engaged net portion from said members.

3. An apparatus as defined in claim 1 wherein said driving means includes two meshed gears rigidly connected to said rotatable members.

4. An apparatus as defined in claim 3 wherein said driving means also includes a driven sprocket rigidly affixed to the outer extremity of said member, a prime mover provided with a driving sprocket, and an endless link belt extending between said sprockets.

5. An apparatus as defined in claim 3 wherein a plurality of circumferentially spaced ribs are provided on the exterior surface of each of said rotatable members that extend susbtantially the full length thereof and serve to increase the frictional engagement between said members and said net.

6. An apparatus as defined in claim 3 wherein said means for driving one of said members is a sheave rigidly affixed to the outer extremity thereof and a driven cable that drivingly engages said sheave.

7. An apparatus as defined in claim 6 wherein two laterally separated guide pulleys are provided that are rotatably supported from said shaft supporting means on opposite sides of said sheave and in the same plane as said sheave, with said cable engaging said pulleys to prevent inadvertent displacement of said cable from said sheave.

8. Apparatus for use in a boat to sequentially raise a fish net and float and lead lines associated therewith from the water onto said boat, comprising: a pair of adjacently disposed, generally upwardly extending fairlead members having confronting resilient surfaces that extend upwardly and radially inwardly relative to their respective vertical center-lines, with the lower portion of each of said fairlead members being in rotary abutting contact and the upper portion therof having a diameter no larger than approximately one-fourth the diameter of said lower portion whereby when said lead line is frictionally disposed within the abutting lower portions of said fairlead members said net and said float line are frictionally disposed within the space defined between said confronting surfaces above said abutting lower portions; a housing for mounting on said boat, said housing supporting said fairlead members; power-operated means associated with said housing; and driving means interposed between said housing and said fairlead members that rotate one of said fairlead members in a clockwise direction and the other of said fairlead members in a counter-clockwise direction to thereby sequentially raise said net and lines onto said boat.

9. Apparatus for use in a boat to sequentially raise a fish net and float and lead lines associated therewith from the water onto said boat, comprising: a pair of adjacently disposed, generally upwardly extending fairlead members having confronting resilient surfaces that extend upwardly and radially inwardly relative to their respective vertical center-lines, with the lower portion of each of said fairlead members being in rotary abutting contact and the upper portion thereof having a diameter no larger than approximately one-fourth the diameter of said lower portion whereby when said lead line is frictionally disposed within the abutting lower portions of said fairlead members said net and said float line are frictionally disposed within the space defined between said confronting surfaces above said abutting lower portions; a housing for mounting on said boat, said housing supporting said fairlead members; power-operated means on said housing; driving means interposed between said housing and said fairlead members that rotate one of said fairlead members in a clockwise direction and the other of said fairlead members in a counter-clockwise direction to thereby sequentially raise said net and lines onto said boat; and a horizontal roller positioned on said housing adjacent one side of said fairlead members to regulate the depth at which said lines and net will travel through said fairlead members when frictionally engaged by said fairlead members.

10. Apparatus for use in a boat to sequentially raise a fish net and float and lead lines associated therewith from the water onto said boat, comprising: a pair of adjacently disposed, generally upwardly extending fairlead members having confronting resilient surfaces that extend upwardly and radially inwardly relative to their respective vertical center-lines, with the lower portion of each of said fairlead members being in rotary abutting contact and the upper portion thereof having a diameter no larger than approximately one-fourth the diameter of said lower portion whereby when said lead line is frictionally disposed within the abutting lower portions of said fairlead members said net and said float line are frictionally disposed within the space defined between said confronting surfaces above said abutting lower portions; a plurality of circumferentially spaced, vertically extending ribs formed on the exterior surfaces of said fairlead members; a housing for mounting on said boat, said housing supporting said fairlead members; power-operated means on said housing; and driving means interposed between said housing and said fairlead members that rotate one of said fairlead members in a clockwise direction and the other of said fairlead members in a counter-clockwise direction to thereby sequentially raise said net and lines onto said boat.

11. Apparatus for use in a boat to sequentially raise a fish net and float and lead lines associated therewith from the water onto said boat, comprising: a pair of adjacently disposed, generally upwardly extending fairlead members having confronting resilient surfaces that extend upwardly and radially inwardly relative to their respective vertical center-lines, with the lower portion of each of said fairlead members being in rotary abutting contact and the upper portion thereof having a diameter no larger than approximately one-fourth the diameter of said lower portion whereby when said lead line is frictionally disposed within the abutting lower portions of said fairlead members said net and said float line are frictionally disposed within the space defined between said confronting surfaces above said abutting lower portions; a plurality of circumferentially spaced, vertically extending ribs formed on the exterior surfaces of said fairlead members; a housing for mounting on said boat, said housing supporting said fairlead members; power-operated means on said housing; driving means interposed between said housing and said fairlead members that rotate one of said fairlead members in a clockwise direction and the other of said fairlead members in a counter-clockwise direction to thereby sequentially raise said net and lines onto said boat; and a horizontal roller positioned on said housing adjacent one side of said fairlead members to regulate the depth at which said lines and net will travel through said fairlead members when frictionally engaged by said fairlead members.

12. Apparatus for use in a boat to sequentially raise a fish net and float and lead lines associated therewith from the water onto said boat, comprising: a housing for mounting on said boat; a pair of generally upwardly extending shafts extending upwardly through said housing; a pair of fairlead members coaxially supported by said shafts and having confronting resilient surfaces that extend upwardly and radially inwardly relative to their respective vertical center-lines, with the lower portion of each of said fairlead members being in rotary abutting contact and the upper portion thereof having a diameter no larger than approximately one-fourth the diameter of said lower portion whereby when said lead line is frictionally disposed within the contacting lower portions of said fairlead members said net and said float line are frictionally disposed within the space defined between said confronting surfaces above said abutting lower portions; power-operated means on said housing; and driving means interposed between said housing and said shafts that rotate one of said shafts in a clockwise direction and the other of said shafts in a counter-clockwise direction whereby said fairlead members cooperate to sequentially raise said net and lines onto said boat, with said housing shielding said driving means from human contact and from contact with said net and lines.

13. Apparatus for use in a boat to sequentially raise a fish net and float and lead lines associated therewith from the water onto said boat, comprising; a pair of adjacently disposed, generally upwardly extending fairlead members having confronting resilient surfaces that extend upwardly and radially inwardly relative to their respective vertical center-lines, with the lower portion of each of said fairlead members being in rotary abutting contact and the upper portion thereof having a diameter sufficiently small that when said bottom line is frictionally disposed within the abutting lower portions of said fairlead members said net and said float line are frictionally disposed within the space defined between said confronting surfaces above said abutting lower portions; a housing for mounting on said boat, said housing supporting said fairlead members; power-operated means on said housing; driving means interposed between said housing and said fairlead members that rotate one of said fairlead members in a clockwise direction and the other of said fairlead members in a counter-clockwise direction to thereby sequentially raise said net and lines onto said boat; and a horizontal roller positioned on said housing adjacent one side of said fairlead members to regulate the depth at which said lines and net will travel through said fairlead members when frictionally engaged by said fairlead members.

14. Apparatus for use on a boat to sequentially raise an elongated fish catching member from the water onto said boat, comprising: a housing for mounting on said boat; a pair of generally upwardly extending shafts extending upwardly through said housing; a pair of fairlead members coaxially supported by said shafts and having confronting resilient surfaces that extend upwardly and radially inwardly relative to their respective vertical center-lines, with the lower portion of each of said fairlead members being in rotary abutting contact with the upper portion thereof, said fish catching member being frictionally disposed within the space defined between said confronting surfaces above said lower portion; power-operated means on said housing; driving means interposed between said housing and said shafts that rotate one of said shafts in a clockwise direction and the other of said shafts in a counter-clockwise direction whereby said fairlead members cooperate to sequentially raise said fish catching member onto said boat with said housing shielding said driving means from human contact and from contact with said net and lines; and a horizontal roller positioned on said housing adjacent one side of said fairlead members to regulate the depth at which said fish catching member will travel through said fairlead members when frictionally engaged by said fairlead members.

References Cited in the file of this patent
UNITED STATES PATENTS
2,714,797   Drummond et al. _____ Aug. 9, 1955